(12) United States Patent
Chen et al.

(10) Patent No.: US 10,206,077 B2
(45) Date of Patent: Feb. 12, 2019

(54) IDENTIFICATION OF PROVISIONING STATUS FOR A SUBSCRIBER IDENTITY MODULE

(71) Applicant: Verizon Patent and Licensing Inc., Arlington, VA (US)

(72) Inventors: Zhengfang Chen, Millburn, NJ (US); Mauricio Pati Caldeira de Andrada, South Plainfield, NJ (US); Taussif Khan, Monroe, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 189 days.

(21) Appl. No.: 15/228,286

(22) Filed: Aug. 4, 2016

(65) Prior Publication Data
US 2018/0041855 A1 Feb. 8, 2018

(51) Int. Cl.
*H04W 4/50* (2018.01)
*H04W 4/14* (2009.01)
*H04L 29/12* (2006.01)
*H04W 60/02* (2009.01)
*H04W 12/04* (2009.01)
*H04L 29/06* (2006.01)

(52) U.S. Cl.
CPC ............ *H04W 4/50* (2018.02); *H04L 63/0853* (2013.01); *H04W 4/14* (2013.01); *H04W 12/04* (2013.01); *H04W 60/02* (2013.01); *H04L 61/1588* (2013.01)

(58) Field of Classification Search
CPC ......... H04W 4/50; H04W 4/001; H04W 4/14; H04W 60/02; H04L 61/605; H04L 63/0853
See application file for complete search history.

(56) References Cited

U.S. PATENT DOCUMENTS 6,148,192 A * 11/2000 Ahvenainen .......... H04W 12/06
379/357.01
2011/0039533 A1* 2/2011 Yi ......................... H04W 60/04
455/419

OTHER PUBLICATIONS

Christian Seeger, Bettina Kemme, and Huaigu Wu. 2010. SMS based group communication system for mobile devices. In Proceedings of the Ninth ACM International Workshop on Data Engineering for Wireless and Mobile Access (MobiDE '10) (continued) (Year: 2010) (continuation) ACM, New York, NY, USA, 41-48. DOI= http://dx.doi.org/10.1145/1850822.1850830 (Year: 2010).*

* cited by examiner

*Primary Examiner* — David Orange (57) ABSTRACT

Identifying an unknown subscriber identity module (SIM) includes reading a first value representing a mobile directory number from the SIM, where the first value is automatically read prior to a registration of a mobile device with a network, and reading a second value representing the mobile directory number from the SIM, where the second value is automatically read after the registration has occurred. The method includes evaluating the first and the second values representing the mobile directory number, and determining a provisioning status associated with the SIM based on the evaluating.

20 Claims, 8 Drawing Sheets

| | FIRST READ: MDN at Power UP | SECOND READ: MDN after delay | Action | Identified Provisioning Status |
|---|---|---|---|---|
| 210 | All Digits Zero | All Digits Zero | None | Un-provisioned SIM |
| 220 | All Digits Zero | Valid MDN | None | Provisioned SIM |
| 230 | Valid MDN | Different Valid MDN | None | Provisioned SIM |
| 240 | Valid MDN | Same Valid MDN | Send App Directed SMS To This MDN | SMS Received: SIM Provisioned / SMS Not Received: SIM Un-provisioned with Current Network |
| 250 | Valid MDN | All Digits Zero | Invalid Condition | Not Applicable |

FIG. 1

| FIRST READ: MDN at Power UP | SECOND READ: MDN after delay | Action | Identified Provisioning Status |
|---|---|---|---|
| All Digits Zero | All Digits Zero | None | Un-provisioned SIM |
| All Digits Zero | Valid MDN | None | Provisioned SIM |
| Valid MDN | Different Valid MDN | None | Provisioned SIM |
| Valid MDN | Same Valid MDN | Send App Directed SMS To This MDN | SMS Received: SIM Provisioned / SMS Not Received: SIM Un-provisioned with Current Network |
| Valid MDN | All Digits Zero | Invalid Condition | Not Applicable |

IDENTIFICATION OF PROVISIONING STATUS FOR A SUBSCRIBER IDENTITY MODULE

BACKGROUND

Full access to a network through a mobile device can be obtained with a subscription to a wireless service plan and provisioning a subscriber identity module (SIM) installed within the mobile device. Given the increasing flexibility of the wireless market, the bundling of mobile devices with wireless service plans is no longer mandatory, and users may now purchase mobile devices independently from their selection of a wireless service plan. To facilitate such flexibility, the provisioning of the SIM may be performed "over the air" through the network. However, the mobile device, at the operating systems and/or applications level, cannot determine the provisioning status of the SIM without complex multi-layer software, firmware, and/or hardware modifications of the mobile device. Other conventional approaches to determine SIM provisioning status utilize network redirect features that may be unreliable and/or negatively impact a user's data allowance.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments are directed to mobile devices which may determine the provisioning status of a SIM. Approaches described herein may be implemented without having to perform complex multi-layer modifications of the mobile device (which may include low level chipset development) to support carrier specific requirements. Moreover, embodiments presented herein do not require redirect actions that may provide limited network access to a portal for unsubscribed users to sign up for a service plan. It may be desirable that the mobile device, at the application/operating systems level, have access to information regarding whether or not the user of the mobile device is subscribed to a service plan with the network. For example, if the user does not have a subscription to a service plan, when the mobile device makes a registration attempt with the network, the mobile device (at the operating systems/application level) may determine the user's non-subscription status and can provide the user an opportunity and/or instructions to obtain a subscription to a service plan. Additionally, the mobile device may protect the network operator from un-subscribed users by limiting applications that run in the background from pinging the network unnecessarily when connectivity with WiFi network is unavailable.

When a mobile device is associated with a service plan, the SIM may be provisioned with information to allow the mobile device wireless access to the network. The information may include a mobile directory number (MDN), which may be the actual phone number that can be entered on a keypad to establish a connection with a specific mobile device. If the mobile device is not associated with a service plan, the SIM is not provisioned (also referred to herein as "un-provisioned") and may only have limited network access to the network.

Accordingly, embodiments described herein may utilize a direct and reliable approach to determine the provisioning status of a SIM by performing read operations to determine the value of the MDN stored within the SIM. A first read operation may occur prior to the registration of the mobile device with the network. In an example, mobile device may register with the network soon after powering on. The mobile device may then wait an interval of time that may span minutes (e.g., 2-10 minutes), and then perform a second read operation to determine the value of the MDN stored within the SIM. In an embodiment, the second read operation may be triggered by the SIM itself based on a REFRESH command. The mobile may then evaluate the two MDN values to ascertain whether the SIM has been provisioned with the network, and thus correctly infer whether the user has a subscription for a service plan. In some instances, the mobile device may have to perform further actions depending upon the values of the MDNs obtained during the read operations. For example, in some instances, in order to accurately determine the provisioning status of the SIM, the mobile device may send an application directed short message service (SMS) message (also referred to as an "app directed SMS") to itself.

As used herein, an app directed SMS may be a text message with a special prefix defined by wireless network operator. The app directed SMS may be directed to a specific application running on the mobile device, and can be received at the mobile device without alerting the user similar to a standard SMS message.

Figure 1:
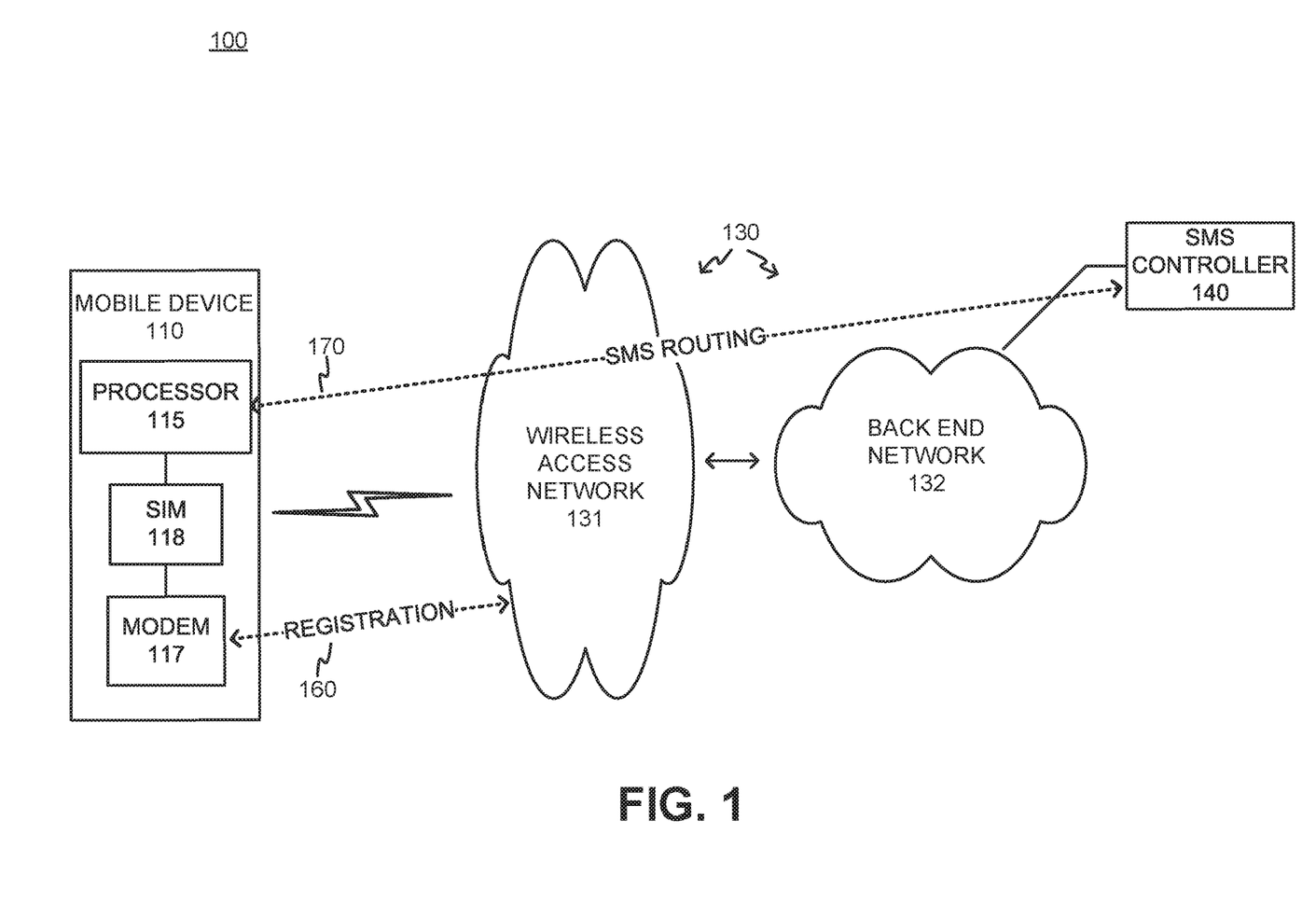
FIG. 1 is a block diagram of an exemplary environment for identifying the provisioning status of a subscriber identity module.

FIG. 1 is a block diagram showing an exemplary network environment 100 for identifying the provisioning status of a subscriber identity module (SIM). The environment may include a mobile device 110, which may further include a processor 115, a SIM 118, and a modem 117. Network environment 100 may further include a short message service (SMS) controller 140. Mobile device 110 and SMS controller 140 may be interconnected by a plurality of networks 130 to provide communications over a variety of different connection. For ease of explanation, only one device 110 and one SMS controller 140 are illustrated as being connected to networks 130. However, it should be understood that a plurality of mobile devices 110, SMS controllers 140, or other known network entities, may be communicatively coupled to networks 130.

Networks 130 may include a plurality of networks of any type, and may be broadly grouped into one or more wireless access network 131 and one or more back end network 132.

Wireless access network 131 provides connectivity between mobile device 110 and other network elements within wireless access network 131 and/or devices connected to back end network 132. Wireless access network 131 may include any type of wireless network, such as, for example, a telecommunications network wireless local area network(s) (LAN) (e.g., WiFi), wireless wide area networks (WAN) (e.g., WiMax), and/or one or more wireless public land mobile networks (PLMNs). The PLMN(s) may include a Code Division Multiple Access (CDMA) 2000 PLMN, a Global System for Mobile Communications (GSM) PLMN, a Long Term Evolution (LTE) PLMN, and Advanced LTE PLMN, and/or other types of PLMNs not specifically described herein. Back end network 132 may exchange data with wireless access network 131 to provide mobile device 110 connectivity to various servers, gateways, and other network entities, which may include one or more SMS controller 140. Back end network 132 may include a wide area network (WAN), a metropolitan area network (MAN), an intranet, the Internet, a wireless satellite network, a cable network (e.g., an optical cable network).

Mobile device 110 may include any type of electronic device having communication capabilities, and thus communicate over networks 130 using a variety of different channels, including both wired and wireless connections. Mobile device 110 may include, for example, a cellular radiotelephone, a smart phone, a tablet, a set-top box (STB), a mobile phone, a Voice over Internet Protocol (VoIP) device, a laptop computer, a palmtop computer, a gaming device, a media player device, or a digital camera that includes communication capabilities (e.g., wireless communication mechanisms). Mobile device 110 may include processor 115 that may primarily function at the operating system and application level, and exchange user data within the access stratum. Mobile device 110 may also include SIM 118, which may further include its own processor and memory, and store various identification and/or authentication information (including MDNs) to allow mobile device 110 secure access to wireless network 131, and allow for proper metering and billing of data usage. Mobile device 110 may also include modem 117 that may operate in the non-access stratum and thus facilitate signaling and coordination with network devices in wireless access network 131. Details of processor 115, modem 117, and SIM 118 are described in reference to FIG. 4.

SMS controller 140 may be a network device (e.g. a server) that manages and/or routes SMS messages which are transferred between mobile devices. SMS controller 140 may communicate with mobile device 110 over access network 131 and back end network 132 using conventional SMS protocols. Additionally, SMS controller 140 may communicate with other network infrastructure devices (not shown) over back end network 132. While only one SMS controller 140 is shown in FIG. 1, in various embodiments, multiple SMS controllers 140 may be associated with different entities and used within environment 100.

Further referring to FIG. 1, the following may be used to determine a provisioning status of a SIM according to an embodiment. Prior to registration, processor 115 may communicate with the SIM and read a first value representing the MDN which may be stored within the SIM. The first value may be read upon powering up mobile device 110. After the first value for the MDN is read by processor 115, modem 117 may initiate a registration process 160 with wireless access network 131. The registration process 160 may include an "Over The Air" (OTA) activation of SIM 118. During the registration process 160, information is provided to mobile device 110 via modem 117, which includes an MDN value assigned by the wireless access network 131. The MDN value is received by wireless access network 131 and subsequently provided to SIM 118, where the MDN value may be stored. After modem 117 completes the registration process 160, processor 115 will read a second value representing the MDN from the SIM 118. In an embodiment, the second read operation may occur after a predetermined amount of time from the first read operation, or alternatively, triggered by SIM 118 to re-read the MDN value. In another embodiment, modem 117 and/or SIM 118 may provide a signal to processor 115 indicating that the registration process with the wireless access network 131 is complete. In either case, once processor 115 has two separate values representing the MDN, it may perform an evaluation based on the two values as to whether the SIM is provisioned or un-provisioned. Details of the evaluation with respect to specific values for the values representing the MDN are described in reference to FIG. 2.

In one embodiment, when the evaluation finding that the first value and the second value are equal and both represent a valid MDN number, there are two possibilities for the provisioning status of SIM 118. The first possibility is that SIM 118 was previously used for a subscription which has been deactivated, and thus SIM 118 no longer is associated with a valid service plan on wireless access network 131. In other words, SIM 118 was activated and provisioned for a subscription that was subsequently cancelled or expired.

The second possibility is that SIM 118 is properly provisioned with the information associated with an active subscription for a valid service plan (i.e., SIM 118 is properly activated). In order to differentiate between the two cases, processor 115 may send an SMS directed to the MDN values which were read from SIM 118 (note that the SMS is directed to a single MDN as the first value and the second value are equal). Accordingly, an SMS routing 170 occurs where mobile device 110, via processor 115, sends the SMS by routing the outgoing SMS to SMS controller 140. SMS controller 140 receives the SMS, and routes the SMS back to the destination MDN value. If the MDN value is associated with an active subscription, mobile device 110 will receive the SMS from SMS controller 140. At this point, processor 115 may determine that SIM 118 is provisioned, and mobile device 110 is associated with an active subscription to a service plan. If mobile device 110 does not receive the SMS that was routed to the MDN by SMS controller 140 (e.g., after waiting for a predetermined timeout period), processor 115 may infer that SIM 118 is un-provisioned, and mobile device 110 is not associated with an active subscription to a service plan. As will be explained in more detail with respect to FIG. 2, the SMS included in SMS routing 170 may be an app directed SMS, which can be received by mobile device 110 and provided directly to an application running on processor 115 without notifying the user of mobile device 110.

Embodiments presented herein for determining the provisioning status of SIM 118 are robust and use functionalities that will work on different mobile operating system platforms, regardless of whether the mobile device is currently connected to Wi-Fi network, and regardless of whether mobile device 110 has mobile data (i.e., Internet packet data network (PDN) access). Moreover, embodiments may be based on implementing logic in processor 115 which may be using a SIM from any wireless network operator. In some embodiments, a slight modification of the SMS content may be involved when an app directed SMS is used to provide a prefix so processor 115 properly directs the received SMS to the desired application. Because embodiments do not require dedicated network support, the approaches used herein save device manufacturers development and testing time and effort by not having to support otherwise sophisticated and operator specific requirements to identify the provisioning status of SIM 118.

Figure 2:
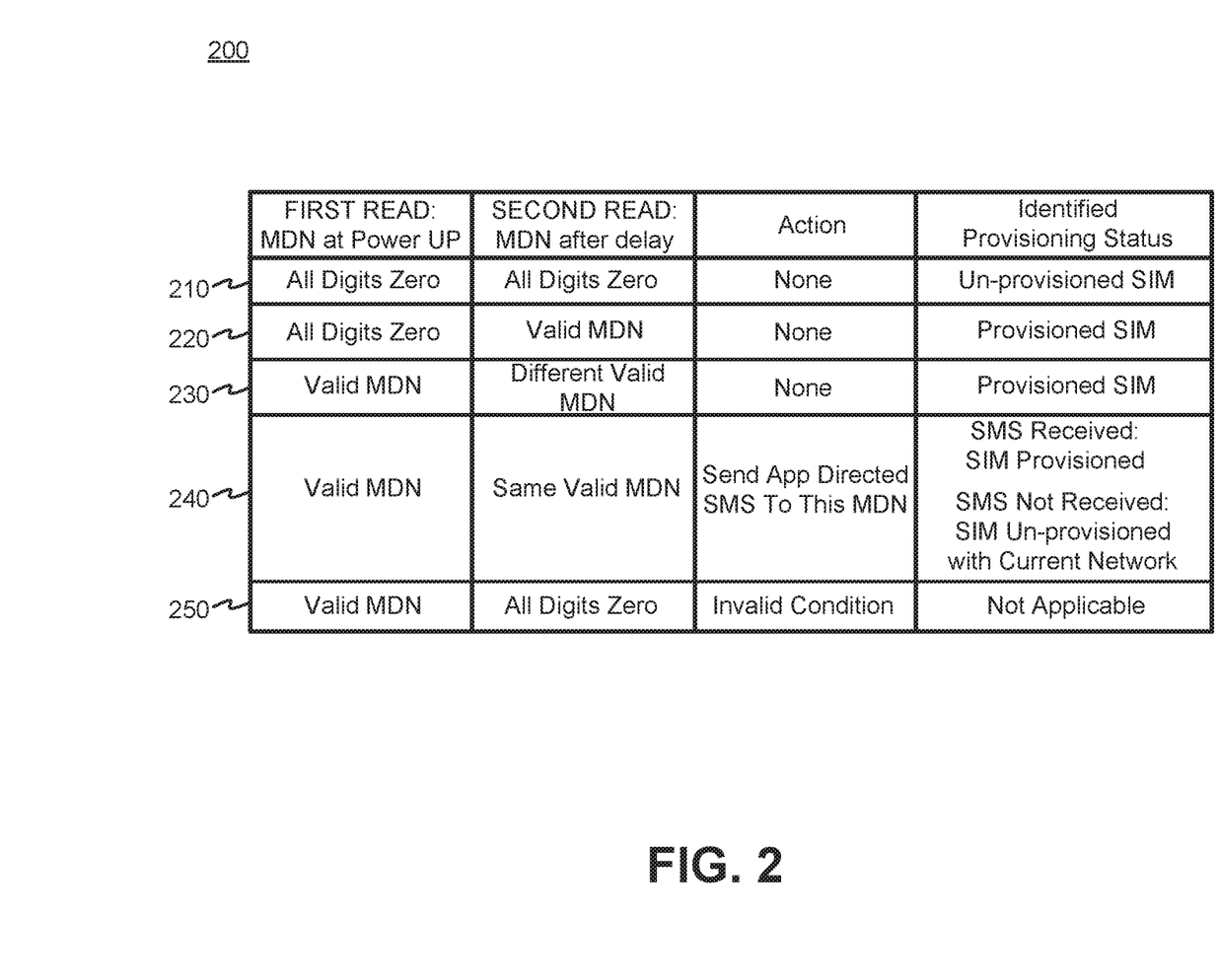
FIG. 2 is a table depicting exemplary conditions associated with different combinations of mobile director number (MDN) values and actions performed based on the conditions.

FIG. 2 is a table 200 depicting exemplary conditions associated with different combinations of MDN values and actions performed based on the conditions. The different conditions may be divided into five separate cases grouped into rows 210 through 250 of table 200. The first column of table 200 indicates the first value representing the MDN as determined by the first read operation performed by processor 115. The first read operation occurs prior to mobile device 110 undergoing registration process 160. In an embodiment, the first read operation may occur shortly after mobile device 110 has been powered up. The second column of table 200 indicates the second value representing the MDN as determined by the second read operation performed by processor 115. The Actions listed in the third column of table 200 may be performed by processor 115 based on the first and second values for the MDN. The Identified Provisioning Status listed in the fourth column of table 200 are the results of processor 115 identifying the provisioning status of SIM 118.

In an embodiment, mobile device 110 may, for example after powering up, automatically initiate registration process 160 with wireless access network 131 and attempt to perform an OTA activation of SIM 118. The OTA activation may complete in minutes (e.g., less than 2 minutes, typically no more than 10 minutes). When mobile device 110 is subscribed to a service plan, SIM 118 may be provisioned in the operator's network. If the OTA activation completes successfully, the MDN will be assigned to mobile device 110 and be pushed to SIM 118 during OTA activation. Other parameters and/or profiles, including various authentication and/or validation credentials that reflect the provisioning of the service plan, may also be pushed to SIM 118 upon a successful OTA activation. If mobile device 110 is not subscribed to a service plan, OTA activation will not be allowed so SIM 118 cannot be provisioned and the credentials (including the MDN) cannot be updated. A SIM that is un-provisioned may be referred to as a "cold SIM." Cold SIMs may be divided into two types.

The first type of cold SIM may be a new SIM, which has never been activated, and may store default parameters and credentials provided by the manufacturer of the SIM. The default credentials provided by the manufacturer for the MDN may be a plurality of digits which are all zero. The second type of cold SIM, which may be referred to as a "toasted SIM," may be a SIM that was previously activated with a valid MDN associated with a service plan, but the subscription to the service plan was terminated (either by the user or by the network operator). The toasted SIM may still have contents stored within its memory that are associated with old registration information that is no longer representative of an active service plan. However, the toasted SIM may be re-provisioned once the user signs up to a new subscription plan for service. Such a situation can arise when a user's old subscription plan was canceled or expired and a new plan is subscribed with the same operator.

Referring back to table 200 in FIG. 2, the conditions corresponding to case 210 may be consistent with the first type of "cold SIM" described above. Specifically, upon processor 115 performing a first read operation on SIM 118 (e.g., during power up), the first value corresponding to the MDN may be a number of digits which are all zero. During the second read operation, which may be performed after a delay (e.g., 10 minutes) from the first read operation, the value read by processor 115 is still all zeros. When both the first value and the second value representing the MDN are all zeros, then no further action need be taken by processor 115, and processor 115 may identify the provisioning status of SIM 118 as being un-provisioned.

The conditions for case 220 may correspond to processor 115 performing the first read operation on SIM 118 (e.g., during power up), where the first value corresponding to the MDN may be a number of digits which are all zero. During the second read operation which is delayed from the first read operation, the value read by processor 115 is a valid MDN. A valid MDN may be defined herein as a value which is not all zeros and has a format which is appropriate for a phone number in the region for which mobile device 110 is operating. When the first value representing the MDN digits which are all zeros, and the second value is a valid MDN, no further action need be taken by processor 115. Processor 115 may identify the provisioning status of SIM 118 as being provisioned as shown in the last column of table 200.

The conditions for case 230 may correspond to processor 115 performing the first read operation on SIM 118 (e.g., during power up), where the first value may be a valid MDN. During the second read operation which is delayed from the first read operation, the second value read by processor 115 is another valid MDN which is different from the first value. In case 230, where two different MDN values are read during the first and second read operations, no further action need be taken by processor 115. Processor 115 may identify the provisioning status of SIM 118 as being provisioned as shown in the last column of table 200.

The conditions for case 240 may be consistent with the second type of "cold SIM" described above, i.e., a toasted SIM. Specifically, upon processor 115 performing a first read operation on SIM 118 (e.g., during power up), the first value corresponding to the MDN may be a valid MDN. During the second read operation which is delayed from the first read operation, the second value read by processor 115 is also a valid MDN which is equal to the first value read previously. In an embodiment, processor 115 may generate and send an SMS message to the valid MDN which was read during both the first and second read operations. Because the SMS protocol is being used, connections to WiFi and/or data (e.g., internet) access to a packet data network is irrelevant, as SMS will also work with voice connectivity protocols to wireless access network 131. If the SIM has been activated with a valid MDN and thus mobile device 110 is associated with an active subscription to a service plan, the sent SMS will be received by mobile device 110. Accordingly, upon receiving the SMS message, processor 115 will identify SIM 118 as being provisioned as shown in the last column of table 200. Alternatively, if the SMS is not received after a predetermined period of time such as, for example, two minutes, processor 115 may assume SIM 118 has not been activated (e.g., SIM 118 is a toasted SIM), and thus will identify SIM 118 as being un-provisioned. Accordingly, there is no issue with another user whose SIM is actually provisioned with this MDN (as operators may re-use MDNs) receiving the SMS, because an un-provisioned SIM is not allowed to access SMS controller 140. As a result, SMS controller 140 will not handle a request to route an intended outgoing SMS, and therefore no SMS will be received at mobile device 110 when SIM 118 is un-provisioned.

In an embodiment for case 240, the SMS message sent to the MDN may be an app directed SMS. The app directed SMS may be managed by processor 115 without notifying the user. For example, the app directed SMS may be delivered to and/or deleted by mobile device 110 "silently" without notifying or alerting the user. If a regular SMS message is used, it may be displayed on the user interface of mobile device 110 and/or cause an audible alert to sound, which may confuse the user as the SMS would be unexpected. Additionally, the user may be suspicious of an unexpected SMS message coming from a number corresponding to the user's device. Moreover, an app directed SMS does not count against the user's allotment of SMS messages. An app directed SMS is specifically formatted using a designated prefix so the SMS may be properly recognized by processor 115. For example, the SMS message format may be as follows: "//VZWFREE-MSG: This message is to test if the SIM is a cold SIM." The operating system and/or an application executing on processor 115 may identify the special prefix and a predefined string inside the message body upon being received.

Referring back to table 200 in FIG. 2, the conditions for case 250 may correspond to processor 115 performing the first read operation on SIM 118 (e.g., during power up), where the first value is a valid MDN. During the second read operation, which is delayed from the first read operation, the value read by processor is a number of digits which are all zero. Such a condition is invalid since wireless access network 131 will not perform an OTA provisioning of SIM 118 using all zeros for the MDN. Accordingly processor 115 will not perform any subsequent actions, and will not identify the provisioning status of SIM 118.

Figure 3:
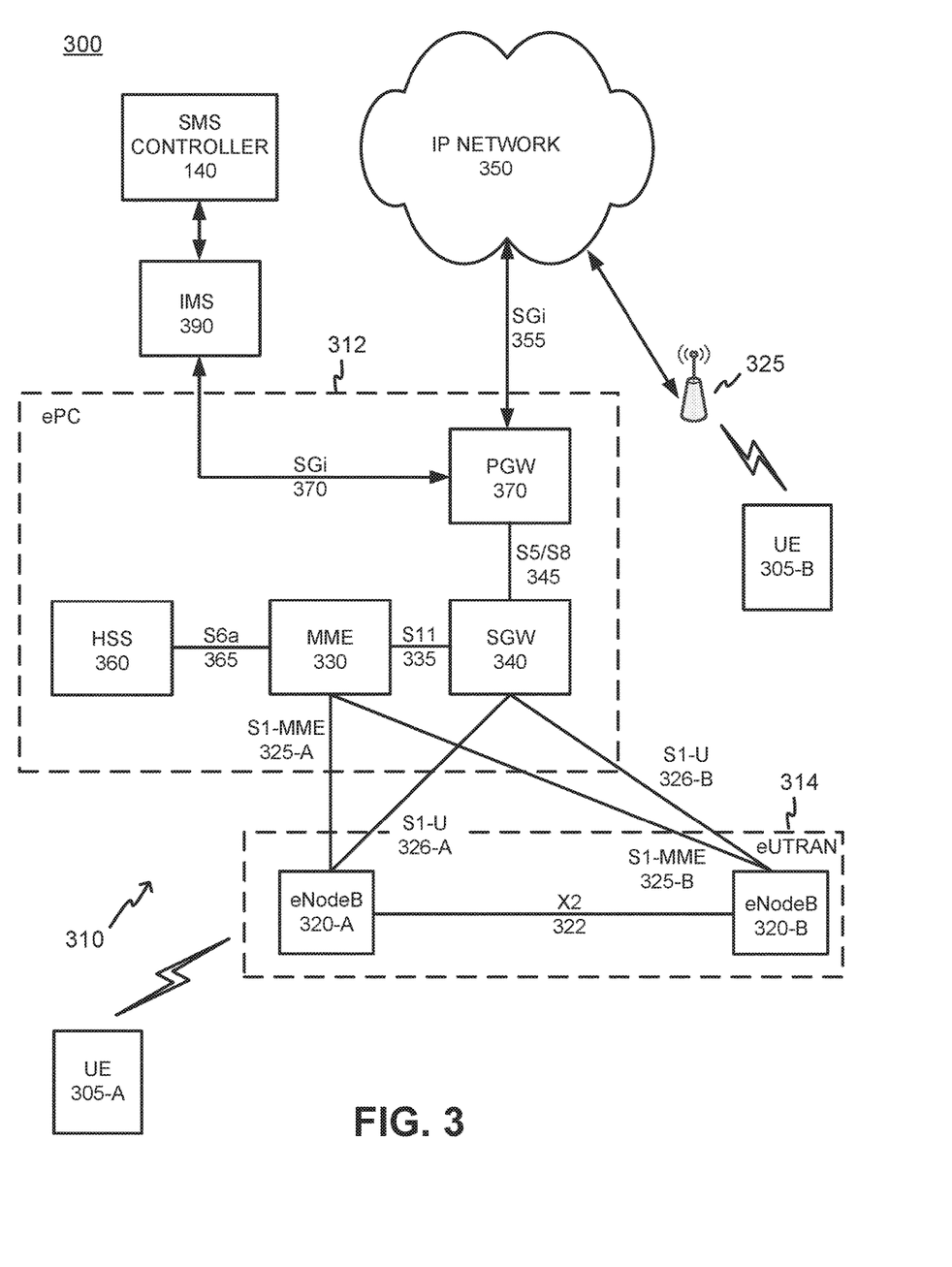
FIG. 3 is a block diagram of an exemplary networking system having a long term evolution (LTE) wireless access network.

FIG. 3 is a block diagram of an exemplary networking system 300 having a long term evolution (LTE) wireless access network. Networking system 300 may include mobile device 110 embodied as UEs 305-A and 305-B (as used herein, collectively referred to as "UE 305" and individually as "UE 305-x"), wireless access network 131 embodied as an LTE wireless network 310, which includes an evolved Packet Core (ePC) 312 and an evolved Universal Mobile Telecommunications System (UMTS) Terrestrial Network (eUTRAN) 314, an Internet Protocol (IP) network 350 which may be embodied as or included in back end network 132, a WiFi wireless access point (WAP) 325, Internet protocol multimedia system (IMS) 390, and SMS controller 140.

LTE wireless network 310 may include one or more devices that are physical and/or logical entities interconnected via standardized interfaces. LTE wireless network 310 provides wireless packet-switched services and wireless IP connectivity to user devices to provide, for example, which include data, voice, and/or multimedia services. The ePC 312 may further include a mobility management entity (MME) 330, a serving gateway (SGW) device 340, a packet data network gateway (PGW) 370, and a home subscriber server (HSS) 360. The eUTRAN 314 may further include one or more eNodeBs 320 (herein referred to collectively as "eNodeB 320" and individually as "eNodeB 320-x"). It is noted that FIG. 3 depicts a representative networking system 300 with exemplary components and configuration shown for purposes of explanation. Other embodiments may include additional or different network entities in alternative configurations than which are exemplified in FIG. 3.

Further referring to FIG. 3, each eNodeB 320 may include one or more devices and other components having functionality that allow UE 305 to wirelessly connect to eUTRAN 314. ENodeB 320 may interface with ePC 312 via a S1 interface, which may be split into a control plane S1-MME interface 325 and a data plane S1-U interface 326. S1-MME interface 325 may interface with MME 330. S1-MME interface 325 may be implemented, for example, with a protocol stack that includes a Non-Access Stratum (NAS) protocol and/or Stream Control Transmission Protocol (SCTP). S1-U interface 326 may interface with SGW 340 and may be implemented, for example, using a General Packet Radio Service Tunneling Protocol version 2 (GTPv2). eNodeB 320-A may communicate with eNodeB 320-B via an X2 interface 322. X2 interface 322 may be implemented, for example, with a protocol stack that includes an X2 application protocol and SCTP.

MME 330 may implement control plane processing for LTE wireless network 310. For example, MME 330 may implement tracking and paging procedures for UE 305, may activate and deactivate bearers for UE 305, may authenticate a user of UE 305 and/or register UE 305 to provide MDN values, and may interface to non-LTE radio access networks. A bearer may represent a logical channel with particular quality of service (QoS) requirements. MME 330 may also select a particular SGW 340 for a particular UE 305. A particular MME 330 may interface with other MMEs 330 in ePC 312 and may send and receive information associated with UEs 305, which may allow one MME 330 to take over control plane processing of UEs serviced by another MME 330, if the other MME becomes unavailable.

SGW 340 may provide an access point to and from UE 305, may handle forwarding of data packets for UE 305, and may act as a local anchor point during handover procedures between eNodeBs 320. SGW 340 may interface with PGW 370 through an S5/S8 interface 345. S5/S8 interface 345 may be implemented, for example, using GTPv2.

PGW 370 may function as a gateway to IP network 350 through a SGi interface 355. IP network 350, which may provide various services (e.g., over the top voice services) to UE 305. A particular UE 305, while connected to a single SGW 340, may be connected to multiple PGWs 350, one for each packet network with which UE 305 communicates.

Alternatively, UE 305 may exchange data with IP network 350 though WiFi wireless access point WAP 325. The WiFi WAP 325 may be part of a local area network, and access IP network 350 through a wired connection via a router. Alternatively, WiFi WAP 325 may be part of a mesh network (e.g., 801.11s). WiFi WAP 325 may be part of a local area network, or part of a wide area network (WiMaxx) or a mesh network (801.11s).

MME 330 may communicate with SGW 340 through an S11 interface 335. S11 interface 335 may be implemented, for example, using GTPv2. S11 interface 335 may be used to create and manage a new session for a particular UE 305. S11 interface 335 may be activated when MME 330 needs to communicate with SGW 340, such as when the particular UE 305 attaches to ePC 312, when bearers need to be added or modified for an existing session for the particular UE 305, when a connection to a new PGW 370 needs to created, or during a handover procedure (e.g., when the particular UE 305 needs to switch to a different SGW 340).

HSS 360 may store information associated with UEs 305 and/or information associated with users of UEs 305. For example, HSS 360 may store user profiles that include registration, authentication, and access authorization information. For example, HSS 360 may associate user subscription to service plans to specific MDNs. MME 330 may communicate with HSS 360 through an S6a interface 365. S6a interface 365 may be implemented, for example, using a Diameter protocol.

IMS 390 may provide an architectural framework and network devices to support for the delivery of multimedia applications and/or voice services over an IP transport, which may include applications/services based on Session Initiation Protocol (SIP). IMS 390 may serve as an overlay network above underlying networks to provide interoperability among IP enable network devices. IMS 390 may provide for a standardized function as a gateway to IP network 350 through a SGi interface 355 with PGW 370. The architecture of IMS 390 may include three separate layers: the connectivity layer, the control layer and the service layer. The connectivity layer may include routers, switches and access elements that may be positioned at the edge of LTE wireless network 310. The connectivity layer is the layer at which individual users are connected to the network via UEs 305. The control layer includes control network devices, such as, for example, control servers that may manage call and/or data session set-up, modification and disconnect/release. Examples of a control network device include a call session control function (CSCF). The CSCF may function as a SIP server that may handle call set-up between UEs 305. The service layer, which may also be referred to as the application layer, may include content and/or application provider devices (e.g., servers) that may provide a enhanced service features for IMS-enabled networks. Based on this architecture, providers may offer session based application services (e.g., SMS messaging).

SMS controller 140 may be any network device which may manage and coordinate the routing of SMS messages among network devices in networking environment 300. SMS controller may interface to IMS 390 using any suitable physical interlink and protocol (e.g., TCP/IP).

While FIG. 3 shows exemplary components of networking system 300, in other implementations, networking system 300 may include fewer components, different components, differently arranged components, or additional components than depicted in FIG. 3. Additionally or alternatively, one or more components of networking system 300 may perform functions described as being performed by one or more other components of networking system 300.

Figure 4:
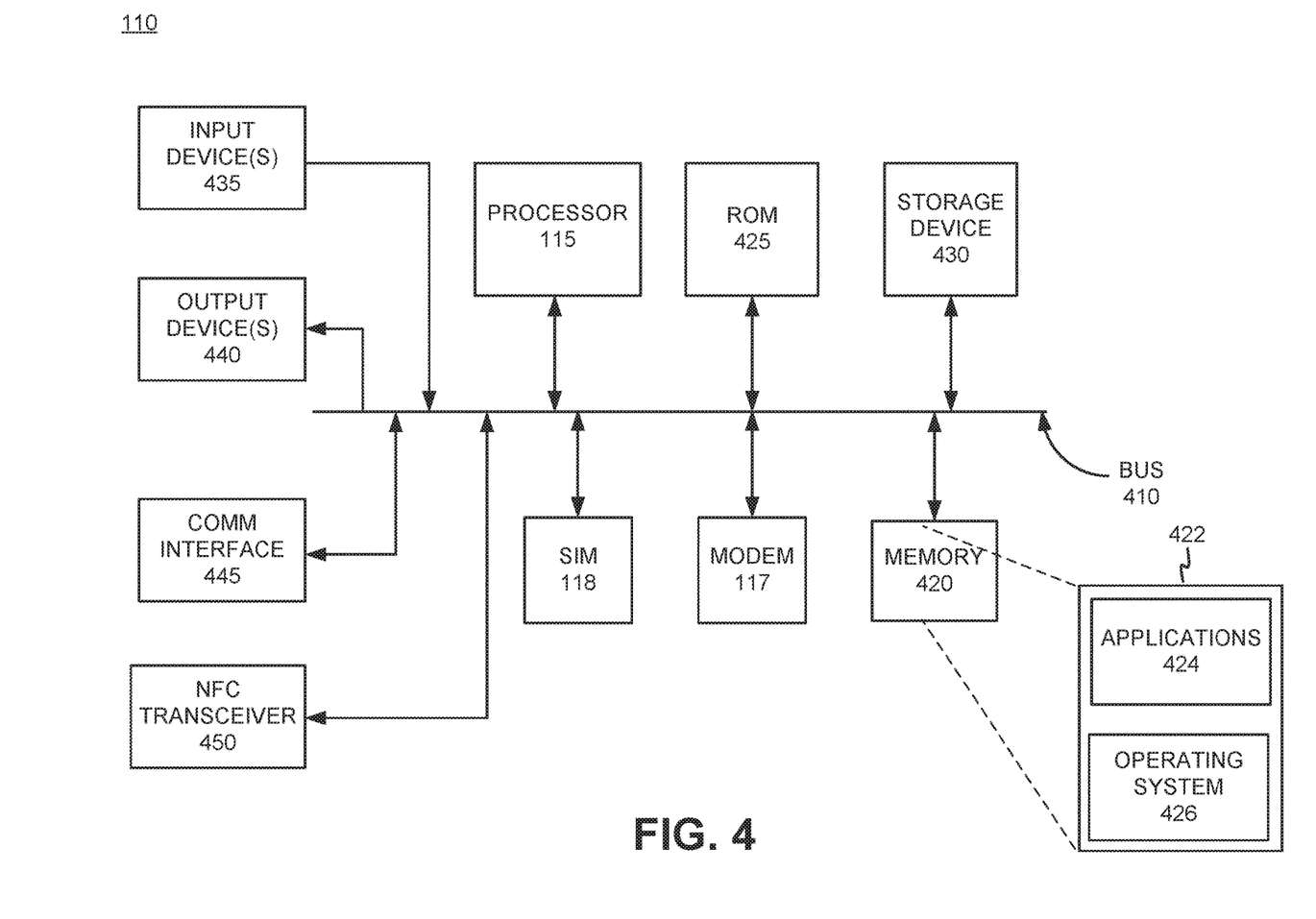
FIG. 4 is a block diagram showing exemplary components of a mobile device according to an embodiment.

FIG. 4 is a block diagram showing exemplary components of mobile device 110 according to an embodiment. Mobile device 110 may include processor 115, modem 117, SIM 118, a bus 410, a memory 420, which may include instruction storage 422 for applications 424 and operating system 426. Memory 420 may further include data storage space (not shown). Mobile device 110 may further include a read only memory (ROM) 425, a storage device 430, an input device(s) 435, an output device(s) 440, a communication interface 445, and a Near Field Communications (NFC) transceiver 450. Bus 410 may include a path that permits communication among the elements of mobile device 110. SIM 118 may be inserted into a SIM interface (I/F) of mobile device 110.

Processor 115 may include a processor, microprocessor, or processing logic that may interpret and execute instructions. Memory 420 may include a random access memory (RAM) or another type of dynamic storage device that may store information and instructions for execution by processor 115. ROM 425 may include a ROM device or another type of static storage device that may store static information and instructions for use by processor 115. Storage device 430 may include a magnetic and/or optical recording medium and its corresponding drive.

Input device(s) 435 may include one or more mechanisms that permit an operator to input information to device 110, such as, for example, a keypad or a keyboard, a microphone, voice recognition and/or biometric mechanisms, etc. Output device(s) 440 may include one or more mechanisms that output information to the operator, including a display, a speaker, etc. Communication interface 445 may include any transceiver mechanism that enables mobile device 110 to communicate with other devices and/or systems. For example, communication interface 445 may include mechanisms for communicating with another device or system via a network, such as networks 130. A Near Field Communications (NFC) transceiver 450 may interface with bus 410 to permit mobile device 110 to exchange data with NFC readers, thus allowing convenient transactions with appropriately equipped Point of Sale terminals, kiosks, building security gateways, etc.

SIM 118 may be insertable into mobile device 110 via a smart module I/F, which may securely store applications and data (e.g., MDNs) to permit mobile device 110 to interoperate with wireless network 131. SIM 118 may be embodied as any type of physical SIM card (e.g., a full size SIM, a mini SIM, a micro SIM, a nano SIM, an embedded SIM), embodied as a software module with a Universal Integrated Circuit Card (UICC), a removable user identity card (R-UIM), a universal subscriber identity module (USIM), or an Internet Protocol (IP) multimedia services identity module (ISIM). SIM 118 may be embodied as an integrated circuit chip to securely store user and network parameters, such as, for example, the MDN, the international mobile subscriber identity (IMSI) number, security authentication and ciphering information (which may be to identify and authenticate subscribers), temporary information related to the local network, a list of the services the user has access to, and passwords which may include a personal identification number (PIN) for ordinary use, and a personal unblocking code (PUK) for PIN unlocking.

Device 110 may perform certain operations or processes, as may be described in detail below. Device 110 may perform these operations in response to processor 115 executing software instructions contained in a computer-readable medium, such as memory 420. A computer-readable medium may be defined as a physical or logical memory device. A logical memory device may include memory space within a single physical memory device or spread across multiple physical memory devices. Memory 420 may further include a memory space 422 which stores applications 424 and operating system 426.

The software instructions may be read into memory 420 from another computer-readable medium, such as storage device 430, or from another device via communication interface 445. The software instructions contained in memory 420 may cause processor 115 to perform operations or processes that will be described in detail with respect to FIGS. 7A and 7B. Alternatively, hardwired circuitry may be used in place of or in combination with software instructions to implement processes consistent with the principles of the embodiments. Thus, exemplary implementations are not limited to any specific combination of hardware circuitry and software.

The configuration of components of mobile device 110 illustrated in FIG. 4 is for illustrative purposes only. It should be understood that other configurations may be implemented. Therefore, mobile device 110 may include additional, fewer and/or different components than those depicted in FIG. 4.

Figure 5:
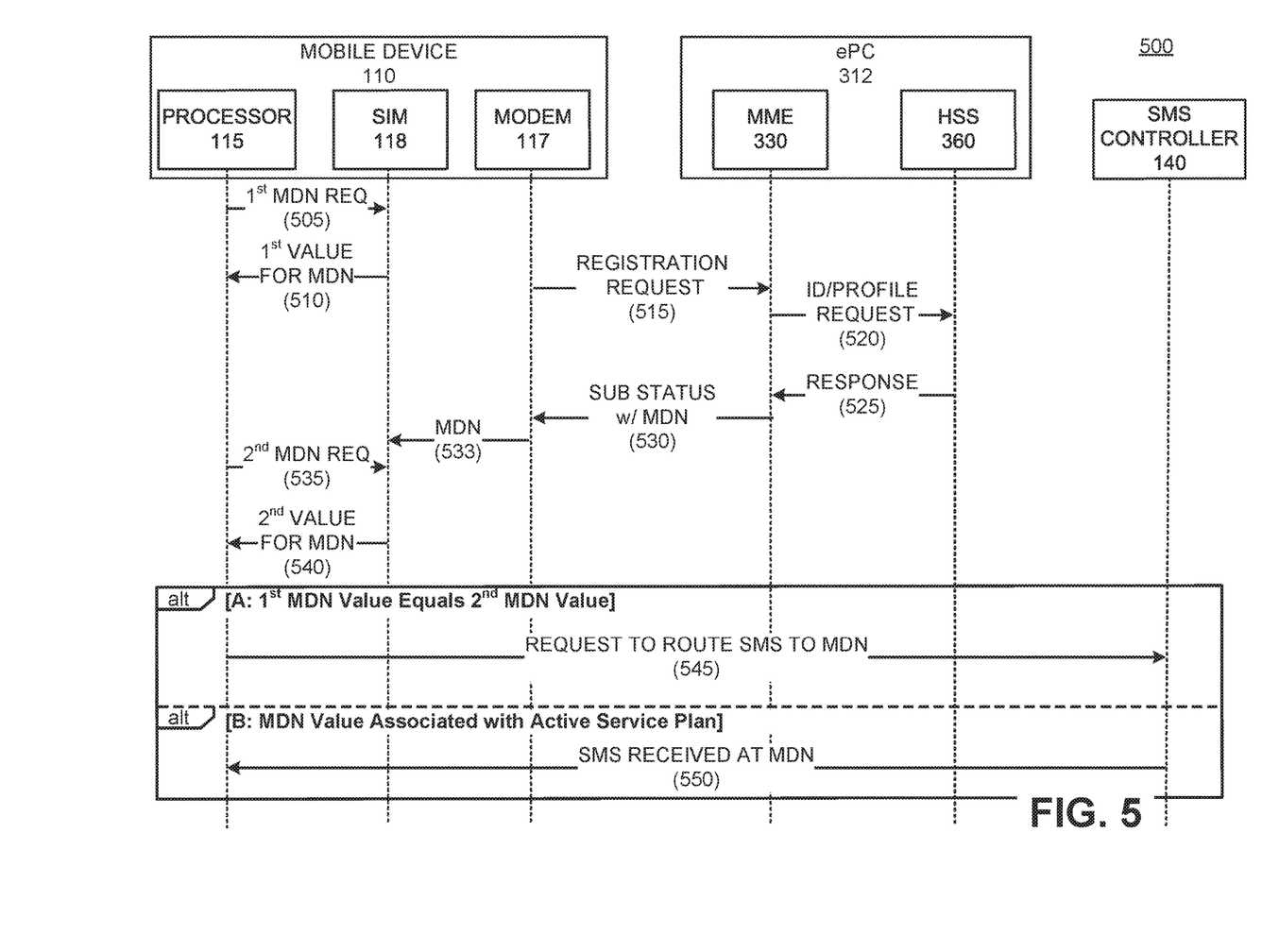
FIG. 5 is an exemplary signal flow diagram illustrating communications between network entities for identifying the provisioning status of a SIM.

FIG. 5 is an exemplary signal flow diagram 500 illustrating communications between network entities for identifying the provisioning status of SIM 118. As shown, within mobile device 110, processor 115 may initially send a request to SIM 118 to read a first value representing an MDN (Message 505). In an embodiment, message 505 may be sent shortly after mobile device 110 is powered on. In other embodiments, message 505 may occur when the cellular radio is reactivated from a sleep state or reset. SIM 118 may respond to message 505 by sending a response containing the first value for MDN (Message 510). After the first value is read by processor 115, modem 117 may send a registration request via eNodeB 320 to MME 330 residing in ePC 312 (Message 515). The registration request may include a request for subscription status. MME 330 may interact with HSS 360 to obtain subscription information regarding the user of mobile device 110, and send an identification and/or profile request to HSS 360 (Message 520). HSS 360 may respond by sending MME 330 a response (Message 525) authenticating the user of mobile device 110, providing subscription status of user of mobile device 110, and/or providing other validating credentials to permit mobile device 110 to securely exchange data with wireless access network 131. Based on the response received in message 525, MME 330 may return the subscription status, along with the MDN, to modem 117 (Message 530). The subscription status may take the form of a network cause code. Modem 117 may then send the MDN to SIM 118 where it may be stored (Message 533). While not shown, modem 117 may provide the subscription status to processor 115, where it may be received by the operating system which may then broadcast the subscription status to applications executing on processor 115. Alternatively, if SIM 118 is not provisioned (e.g., a cold SIM), messages 530 and 533 would not be generated and sent as shown in FIG. 5 since the backend network would have no information regarding an association between the MDN and SIM 118.

Processor 115 may then send a request to SIM 118 to read a second value representing the MDN (Message 535). SIM 118 may respond to message 535 by sending a response containing the second value for MDN (Message 540) which may have been updated by modem 117 in message 530. Once processor 115 has the first and the second values for the MDN, processor 115 may perform an evaluation to ascertain the provisioning status of the SIM. The evaluation depends on the MDN values, as described in relation to FIG. 2 and shown by the various cases 210-250 in table 200.

If processor 115 determines that the first MDN value and the second MDN value are equal (case 240 in table 200 as shown in FIG. 2), then processor 115 may send an SMS directed to the MDN. To accomplish this, processor 115 may send a request to route a SMS to SMS controller 140 (Message 545). Upon receiving the request, the SMS controller 140 will send out the SMS to the MDN as requested. If the MDN is associated with an active service plan, the SMS message sent by controller 140 will be received at mobile device 110 by processor 115 (Message 550).

Figure 6:
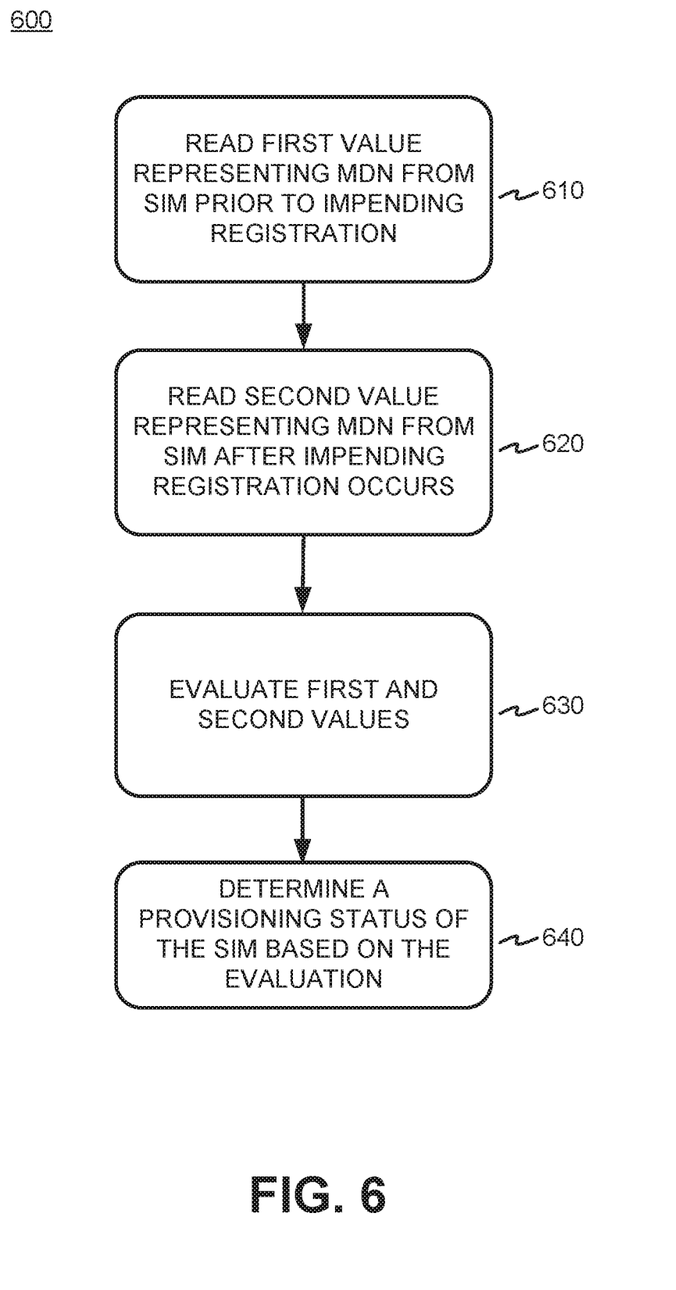
FIG. 6 is a flow chart showing an exemplary process for determining the provisioning status of a SIM.

FIG. 6 is a flow chart showing an exemplary process 600 for determining the provisioning status of a SIM. In an embodiment, process 600 may execute on processor 115 residing in mobile device 110. Initially, processor 115 may read a first value representing the MDN from SIM 118 (Block 610). Processor 115 may automatically read the first value prior to a registration of mobile device 110 with wireless access network 131. For example, in an embodiment, processor 115 may automatically read the first value upon a power initialization of mobile device 110.

Processor 115 may then read a second value representing the MDN from SIM 118 (Block 620). Processor 115 may automatically read the second value after the registration has occurred. In an embodiment, the second value may be read after a predetermined delay from reading the first value. In another embodiment, processor 115 may receive a signal from modem 117 indicating that the registration has occurred, and thus may read the second value after receiving the signal from modem 117.

Processor 115 may then evaluate the first and the second values representing the mobile directory number (Block 630). The evaluation may be based on the first and second values as shown in table 200 and described in reference to FIG. 2. Specifically, the process flows for different cases are described in detail with respect to FIGS. 7A and 7B. Processor 715 may then determine a provisioning status associated with SIM 118 based on the evaluation (Block 640).

Figure 7A:
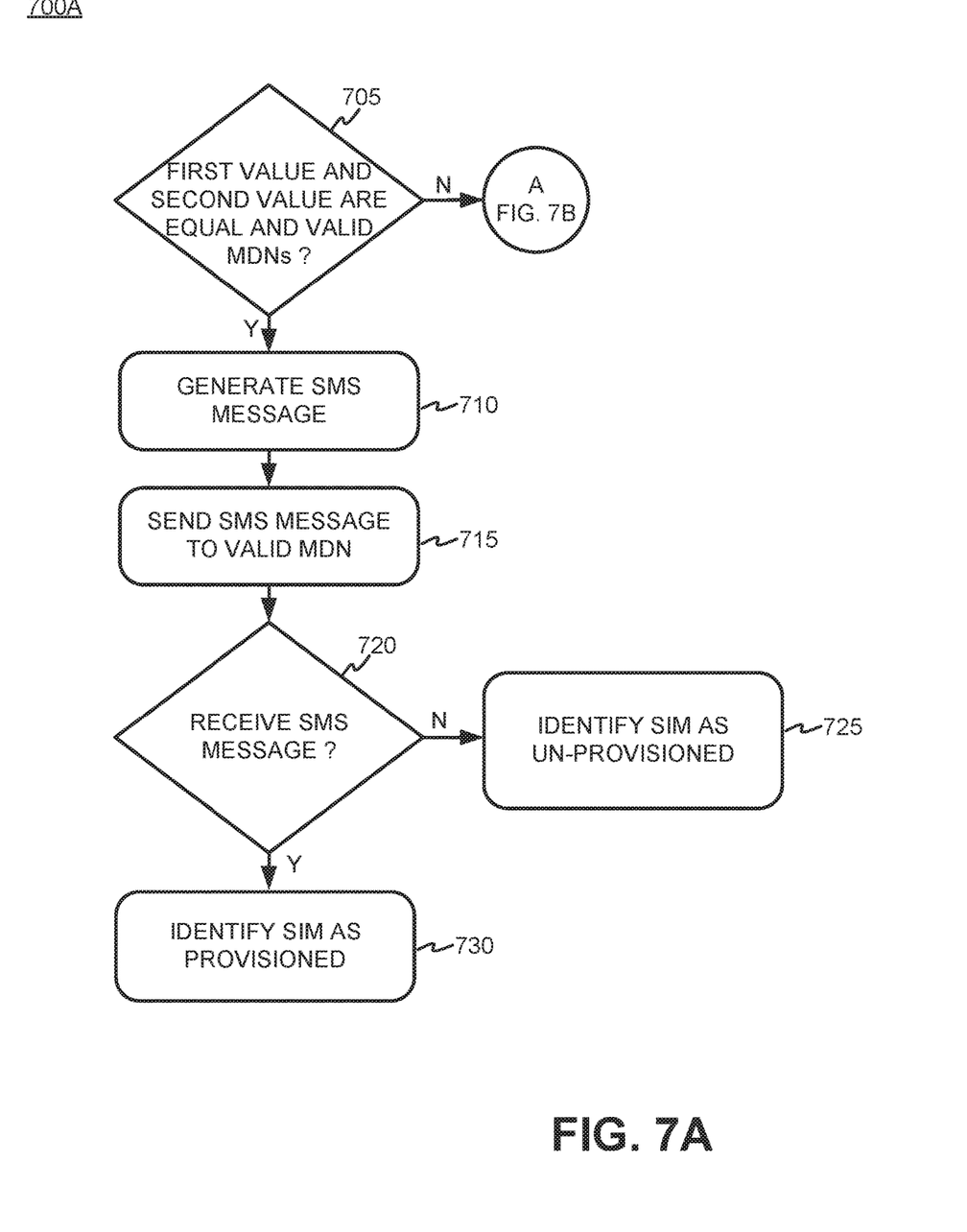
FIGS. 7A and 7B are flow charts showing an exemplary process for evaluating MDN values and identifying the provisioning status of a SIM.

FIG. 7A is a flow chart showing an exemplary process 700A for evaluating the MDN values and identifying the provisioning status of a SIM. Processor 115 may determine whether the first value and the second value read from SIM 118 are equal and are valid MDNs (Block 705). If the determination in Block 705 is no or false, control may pass to process 700B shown in FIG. 7B (Block 705-"N").

If the determination in Block 705 is yes or true, and processor 115 finding that the first value and the second value are equal and represent a valid MDN (Block 705-"Y"), processor 115 will generate an SMS message (Block 710). In an embodiment, the SMS message may be an app directed SMS message. Processor 115 may send the SMS message to the MDN which was read in Blocks 610 or 620, as the values are equal. Processor 115 may determine if the SMS message is received at mobile device 110 (Block 720). If the SMS message was received (Block 720-"Y"), then processor 115 will identify SIM 118 as being provisioned (Block 730). If, after a predetermined delay, processor 715 fails to detect a received SMS message (Block 720-"N"), processor 115 will identify SIM 118 as being un-provisioned (Block 725).

Figure 7B:
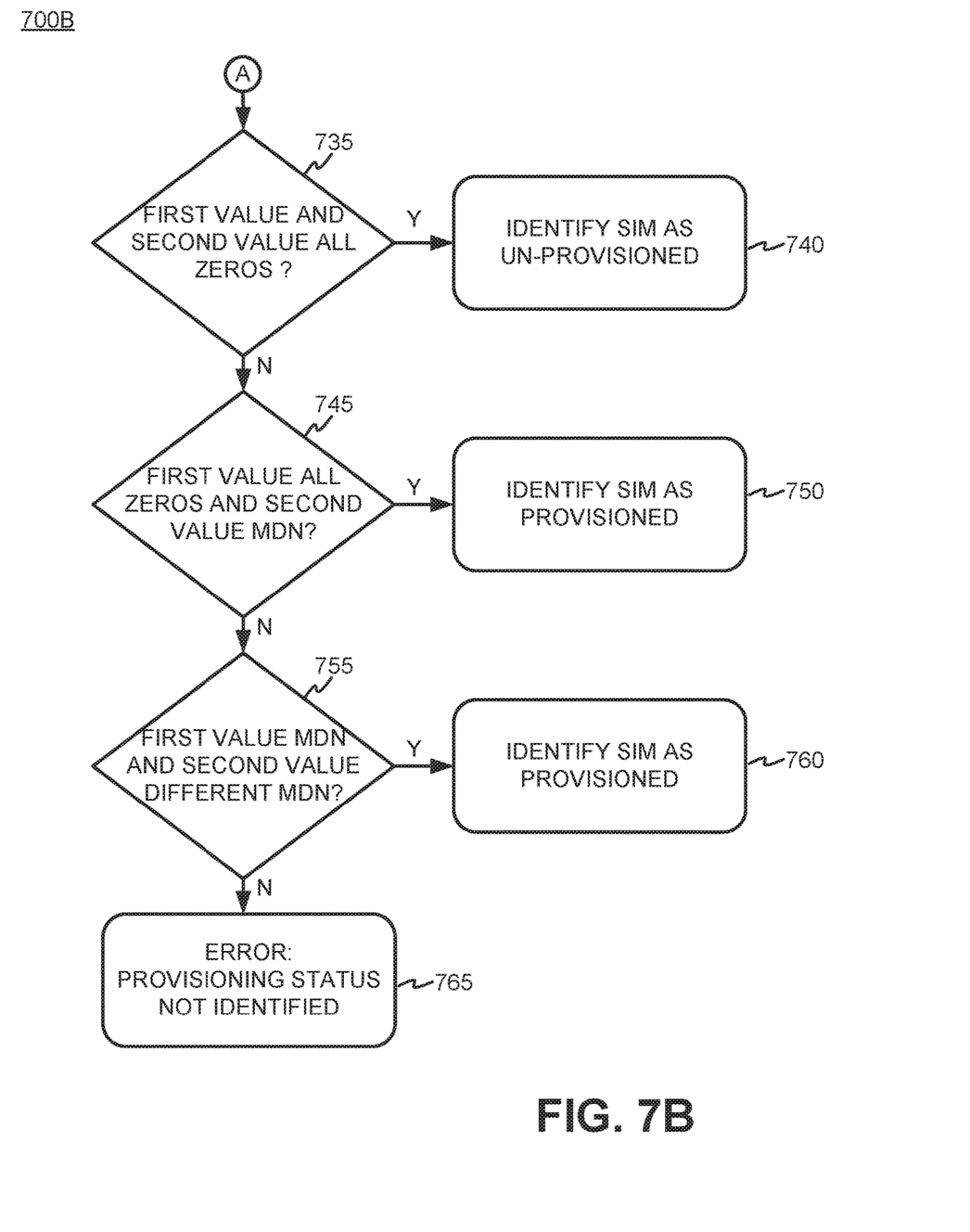

FIG. 7B is a flow chart showing an exemplary process 700B for evaluating the MDN values and identifying the provisioning status of a SIM. When processor 115 determines that the first value representing the MDN and the second value representing the MDN are not equal in Block 705, processor 115 may then determine whether the first value and the second value have digits that are all zero (Block 735). If Block 735 is yes or true, processor 115 may identify the provisioning status associated with SIM 118 as being un-provisioned (Block 740).

If Block 735 is no or false, processor 115 may then determine whether the first value has digits that are all zero, and the second value is a valid mobile directory number (Block 745). If Block 745 is yes or true, then processor 115 may identify the provisioning status of the SIM as being provisioned (Block 750).

If Block 745 is no or false, processor 115 may then determine whether the first value is a valid mobile director number, and the second value is another valid mobile directory number that is different from the first value (Block 755). If Block 755 is yes or true, then processor 115 may identify the provisioning status of the SIM as being provisioned (Block 760). If Block 755 is no or false, then processor 115 may provide an error as the provisioning status of SIM 118 could not be identified (Block 765).

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIGS. 5-7B, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

The terms "comprises" and/or "comprising," as used herein specify the presence of stated features, integers, steps or components but does not preclude the presence or addition of one or more other features, integers, steps, components, or groups thereof. Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method performed in a mobile device, comprising:
    reading a first mobile directory number from a subscriber identity module (SIM), wherein the first mobile directory number is automatically read prior to a registration of the mobile device with a network;
    reading a second mobile directory number from the SIM, wherein the second mobile directory number is automatically read after the registration has occurred;
    determining that the first and the second mobile directory numbers are equal and represent a valid mobile directory number;
    generating a short message service (SMS) message;
    sending the SMS message to the valid mobile directory number; and
    identifying the provisioning status associated with the SIM as being provisioned upon receiving the SMS message sent to the valid mobile directory number.

2. The method of claim 1, wherein reading the first mobile directory number further comprises:
    reading the first mobile directory number upon a power initialization of the mobile device.

3. The method of claim 1, wherein reading the second mobile directory number further comprises:
    reading the second mobile directory number after a predetermined delay from reading the first mobile directory number.

4. The method of claim 1, wherein the generating the SMS message further comprises:
    generating an application directed SMS.

5. A mobile device, comprising:
    a communication interface;
    a memory configured to store instructions; and
    a processor coupled to the communication interface and the memory, wherein the processor is configured to execute the instructions stored in the memory to:
        read a first mobile directory number from a subscriber identity module (SIM), wherein the first mobile directory number is automatically read prior to a registration of the mobile device with a network,
        read a second mobile directory number from the SIM, wherein the second mobile directory number is automatically read after the registration has occurred,
        evaluate the first and the second mobile directory numbers, and
        determine a provisioning status associated with the SIM based on the evaluating, and wherein upon the evaluating finds that the first mobile directory number and the second mobile directory number are equal and represent a valid mobile directory number, the instructions to determine a provisioning status cause the processor to:
            generate a short message service (SMS) message,
            send the SMS message to the valid mobile directory number, and
            identify the provisioning status associated with the SIM as being provisioned upon receiving the SMS message sent to the valid mobile directory number.

6. The mobile device of claim 5, wherein the instructions to determine the provisioning status cause the processor to:
    identify the provisioning status associated with the SIM as being un-provisioned when the evaluating finds that the first mobile directory number and the second mobile directory number have digits that are all zero.

7. The mobile device of claim 5, wherein the instructions to determine the provisioning status cause the processor to:
    identify the provisioning status of the SIM as being provisioned when the evaluating finds that the first mobile directory number has digits that are all zero and the second mobile directory number is a valid mobile directory number.

8. The mobile device of claim 5, wherein the instructions to determine the provisioning status further cause the processor to:
    identify the provisioning status of the SIM as being provisioned when the evaluating finds that the first mobile directory number is a valid mobile directory number, and the second mobile directory number is another valid mobile directory number that is different from the first mobile directory number.

9. The mobile device of claim 5, wherein the instructions to read the first mobile directory number further cause the processor to:
    read the first mobile directory number upon a power initialization of the mobile device.

10. The mobile device of claim 5, wherein the instructions to read the second mobile directory number further cause the processor to:
    read the second mobile directory number after a predetermined delay from reading the first mobile directory number.

11. The mobile device of claim 5, wherein the instructions to generate the SMS message further cause the processor to:
    generate an application directed SMS.

12. A non-transitory computer-readable medium comprising instructions, which, when executed by a processor, cause the processor to:
    read a first mobile directory number from a subscriber identity module (SIM), wherein the first mobile directory number is automatically read prior to a registration of a mobile device with a network;
    read a second mobile directory number from the SIM, wherein the second mobile directory number is automatically read after the registration has occurred;
    evaluate the first and the second mobile directory numbers; and
    determine a provisioning status associated with the SIM based on the evaluating, and wherein upon the evaluating finds that the first mobile directory number and the second mobile directory number are equal and represent a valid mobile directory number, the instructions to determine a provisioning status cause the processor to:

generate a short message service (SMS) message;

send the SMS message to the valid mobile directory number; and identify the provisioning status associated with the SIM as being provisioned upon receiving the SMS message sent to the valid mobile directory number.

13. The non-transitory computer-readable medium of claim 12, wherein the instructions to determine the provisioning status cause the processor to:

identify the provisioning status associated with the SIM as being un-provisioned when the evaluating finds that the first mobile directory number and the second mobile directory number have digits that are all zero.

14. The non-transitory computer-readable medium of claim 12, wherein the instructions to determine the provisioning status cause the processor to:

identify the provisioning status of the SIM as being provisioned when the evaluating finds that the first mobile directory number has digits that are all zero, and the second mobile directory number is a valid mobile directory number.

15. The non-transitory computer-readable medium of claim 12, wherein the instructions to determine the provisioning status further cause the processor to:

identify the provisioning status of the SIM as being provisioned when the evaluating finds that the first mobile directory number is a valid mobile directory number, and the second mobile directory number is another valid mobile directory number that is different from the first mobile directory number.

16. The non-transitory computer-readable medium of claim 12, wherein the instructions to read the first mobile directory number further cause the processor to:

read the first mobile directory number upon a power initialization of the mobile device.

17. The non-transitory computer-readable medium of claim 12, wherein the instructions to read the second mobile directory number further cause the processor to:

read the second mobile directory number after a predetermined delay from reading the first mobile directory number.

18. The method of claim 1, wherein generating a short message service (SMS) message further comprises:

formatting the SMS message so that the SMS message is received without notifying a user.

19. The method of claim 18, wherein formatting the SMS message further comprises:

including a designated prefix so that the SMS may be recognized as an app directed SMS.

20. The method of claim 1, wherein reading the first mobile directory number further comprises:

reading the first mobile directory number upon reactivation of the mobile device from a sleep state.

* * * * *